United States Patent [19]

Jones

[11] Patent Number: 4,891,732
[45] Date of Patent: Jan. 2, 1990

[54] ANTI-LIGHTNING STRIKE FASTENERS FOR COMPOSITE MATERIAL AIRCRAFT STRUCTURES

[75] Inventor: Christopher C. Jones, Lancs, United Kingdom

[73] Assignee: British Aerospace PLC, London, England

[21] Appl. No.: 126,332

[22] Filed: Nov. 30, 1987

[30] Foreign Application Priority Data

Nov. 28, 1986 [GB] United Kingdom ............... 8628555

[51] Int. Cl.$^4$ ............................................. H05F 3/02
[52] U.S. Cl. ..................................... 361/218; 174/2; 244/1 A
[58] Field of Search .............. 361/215, 217, 218, 216, 361/212, 220; 174/2; 244/1 A; 411/103, 104

[56] References Cited

U.S. PATENT DOCUMENTS

| | | | |
|---|---|---|---|
| 3,239,036 | 5/1963 | Scott | 411/907 X |
| 3,989,984 | 11/1976 | Amason et al. | 361/218 X |
| 4,193,435 | 3/1980 | Charles et al. | 411/103 X |
| 4,502,092 | 2/1985 | Bannink, Jr. et al. | 361/218 |
| 4,755,904 | 7/1988 | Brick | 361/218 X |

FOREIGN PATENT DOCUMENTS 0128080 12/1984 European Pat. Off. .
8401487 4/1984 PCT Int'l Appl. .
8502859 7/1985 PCT Int'l Appl. .

OTHER PUBLICATIONS

Formica Brand Anti-Static Laminate Grade 47/Hap. Formica Corporation, 1985.

*Primary Examiner*—L. T. Hix
*Assistant Examiner*—Brian W. Brown
*Attorney, Agent, or Firm*—Cushman, Darby & Cushman

[57] ABSTRACT

A fastener for use with aircraft structures comprising composite materials has improved electrical characteristics designed to reduce damage by lightning strikes. The fastener comprises separate nut and bolt portions and a cage member (4, 1, 6). The nut (4) and the head portion of the bolt 1 both have beveled edges which in use are countersunk in the composite materials to enhance electrical contact between the fastener and aircraft structural members (2, 5). The nut (4) is captively mounted inside the cage member (6) and is moveable, within pre-determined limits, inside the cage (6) so that it may be axially aligned with and the bolt screwed therein, thus compensating for any initial non-alignment of the nut (4) and bolt (1) due to a complex shape of the aircraft structure necessitated by aerodynamic or other considerations.

6 Claims, 2 Drawing Sheets

ANTI-LIGHTNING STRIKE FASTENERS FOR COMPOSITE MATERIAL AIRCRAFT STRUCTURES

This invention relates to fasteners, particularly to fasteners for use on an aircraft incorporating structures made from electrically non-conducting materials such as carbon fibre composites.

Fasteners are used in aircraft structures to secure the skin of the aircraft to an underlying supporting structure e.g. a wing skin may be secured by fasteners to a framework of ribs, spars, and cross members defining the aerodynamic aerofoil wing shape. The fasteners are usually of an electrically conducting material but the skin and sometimes the support will often be made of light weight poorly-conducting composite materials.

If an aircraft structure, such as a wing made of carbon fibre composite material, is struck by lightning any fasteners in the skin concentrate current and are a source of arcing and sparking. The currents which occur from a lightning strike might typically be in the order of 100,000 Amps and can cause severe damage to parts of the aircraft. In some cases arcing between the fasteners and the composite material causes the latter to heat up and disintegrate; it may even catch fire. The danger from lightning strikes is particularly serious near fuel tanks because sparks or burning material could cause an explosion.

Fasteners are often the primary pathways for the conduction of electrical currents from one part of an aircraft to another and poor electrical contact between the fastener and parts of the aircraft structure can result in a high level of damage.

An object of the present invention is to increase the electrical contact between such fasteners and other parts of an aircraft and thereby to improve the condition of lightning current over a large part of the aircraft structure and with minimal arcing so as to reduce damage.

According to one aspect of this invention there is provided a fastener for joining a first structure made of composite material to a second structure made of composite material comprising a bolt being bevelled at one end so it can be countersunk into the surface of said first structure and with a threaded portion at the other end, a captive nut which is capable of co-operating with the threaded portion of the bolt also being bevelled so it can be countersunk into the surface of said second structure, and a cage for holding the nut loosely captive so as to permit limited movement thereof and adapted to be secured to said second structure, whereby in use the bolt may be tightened into the captive nut so as to draw the bevelled surfaces of nut and bolt into intimate contact with said first and second surfaces providing thereby a good electrically conductive path between the fastener and said first and second surfaces and whereby said cage facilitates fastening by initially limiting rotation of the nut and permitting sufficient movement so that the nut may be engaged with the bolt even when the nut and bolt are initially slightly off axis.

In use the cage floatingly mounts said bevelled nut rendering the nut captive and compensating for non-alignment of the bolt with the normal to the skin, due to the complex shape of the skin necessitated by aerodynamic or other considerations.

The term 'bevelled' as used throughout this specification is intended to describe the essentially tapering nature of the bolt head and nut. The taper may be flat sided (multi-faceted) but preferably the taper of said bolt head and nut defines a surface which is substantially conical or at least frusto-conical.

Preferably said nut and bolt portions are coated with a soft electrically conductive material so that in use electrical contact between the fastener and the composite material is enhanced.

Preferably there is provided insulating material on the shank of the bolt from the bevel to the threaded portion.

In one embodiment said nut has an annular flange and the cage comprises a washer-like component having an internal bore of diameter smaller than the diameter of said flange and having crimpable portions which in use may be bent over the annular flange of said nut when located in the internal bore of the cage and crimped thereto to retain said nut captively within the cage.

Preferably the flange has one or more lugs and said crimpable portions have a corresponding number of apertures so that said lugs may be located within said apertures prior to crimping and so that after crimping said nut is substantially prevented from rotation within said cage. Preferably said cage has lugs with rivet or pin locations by which said cage may be secured by rivets or pins to said second surface.

Known aircraft fasteners usually comprise a bolt which is bevelled at one end so it can be countersunk into a surface with a threaded end which has a nut fastened to it having an annular flange or lugs by which the nut is secured to the supporting structure to prevent it falling off the bolt into the aircraft. Any irregularities in the surface of the nut or the flange or lugs are potential sites for arcing. It is not always possible to provide a flush contact between the fastener and an aircraft structure such as a wing because of the complex aerodynamic shape of the wing and small gaps between the fastener parts are inevitable which reduce electrical contact and become potential sites for arcing.

The present arrangement increases electrical contact along the bevelled edges of the fastener and compensates for complex surface shapes. A specific embodiment of the invention will now be described by way of example only and with reference to the accompanying drawings of which:

Figure 1:
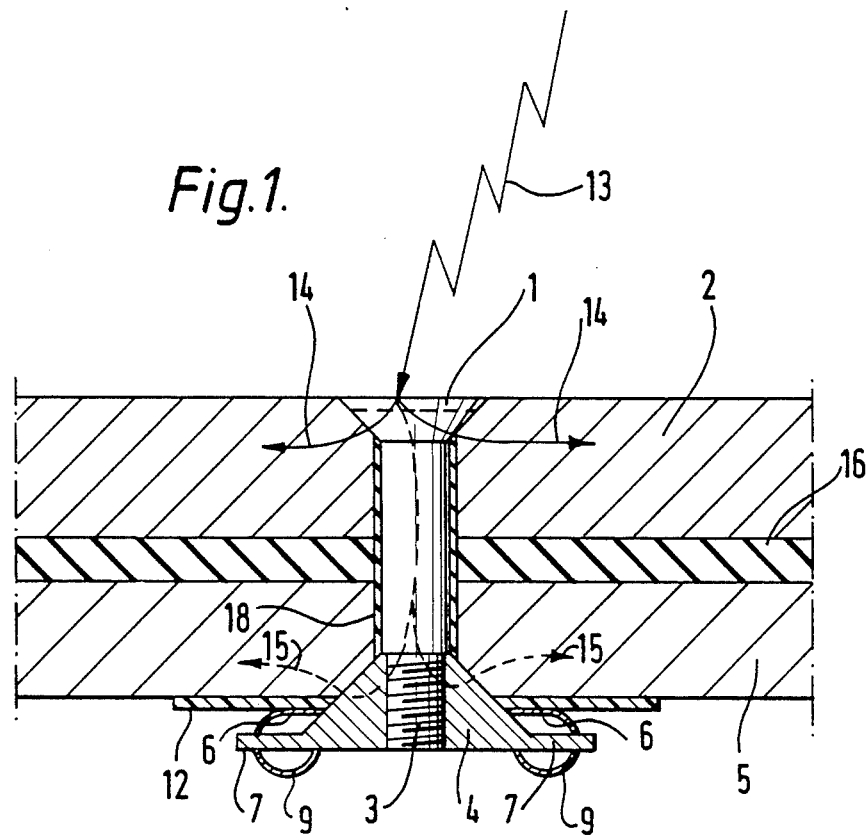
FIG. 1 is a section view showing a fastener holding an aircraft skin to a spar.

Referring to FIG. 1 a fastener is shown being used to attach a wing skin to a wing spar. The fastener comprises a bolt 1 which is bevelled at one end and countersunk into an aircraft wing skin 2. The other end of the bolt has a threaded portion 3 which receives a nut 4 having a circumferential flange 19 (see FIG. 2). The nut 4 is also bevelled and is countersunk into a spar 5. The wing skin 2 and the spar 5 are made of carbon fibre composite material of low weight and high strength. The nut and bolt are made of metal. The bolt may be covered in an insulating material 18 from the bevel to the threaded portion. The nut is attached to and maintained in floating contact with the underside of spar 5 by means of a base plate/cage 6 having crimped portions 9 to which the nut is captively crimped. The nut 4 has two lugs 7 on the flange 19 which are used for mounting the nut in the base plate cage 6. The lugs 7 extend from each side of the flanged surface of the nut 4 and protrude through holes 8 in the crimped portions of the base plate/cage 6 to prevent rotation of the nut when the bolt is tightened. Slots or gaps could be made in the crimped portions 9, for the lugs to pass through, instead of holes.

During assembly the bevelled nut 4 is placed into the central hole 8 of the base plate/cage 6 and two portions 9 of the base plate/cage 6 are folded up and crimped over the lugs 7 of the nut to form the cage. Alternatively the base plate/cage arrangement 6 could be moulded from a plastics material. The nut is then constrained in such a way that it will not rotate or fall out of the base plate/cage 6 yet it is free to float and tilt laterally within it. Because the nut is free to tilt laterally the nut automatically compensates for any misalignments of the bolt from the normal due to surface curvatures. The base plate/cage 6 also has two diametrically opposite lugs 10 with rivet or pin locations 11 by which the base plate/cage 6 is attached to the underside of the wing spar 5 and held in place.

A sheet of sealant material 12 such as PRC is placed between the base plate/cage and the spar 5 to prevent electrical contact. As an option, sealant material may also be placed in the gaps between the crimped portions of the base plate and the edges of the bevelled nut. The bevelled edges of the nut and bolt increase the area of good electrical contact between the fastener and the surfaces of the skin 2 and spar 5. The bevelled nut also floats within the crimped portions of the base plate and is able to compensate for complex curvatures of the parts. The insulation along the shank of the bolt or inside the bolt hole prevent lightning conduction except across the bevelled parts of the fastener.

Should lightning (indicated by line 13) strike the aircraft, a large proportion indicated by arrows 14 of the lightning current, which is typically 100,000 amps, will be conducted without arcing via the heads of the fastener bolts 1 and the good electrical contact provided by their bevelled edges into the wing skin 2 where it will be safely dissipated. A small remaining proportion, indicated by arrows 15 but still of the order of 10–15K amps, will be conducted again without arcing via the good electrical contact provided by the bevelled edges of the nut 4 into the supporting structure e.g. the spar 5, where it too will be safely dissipated without causing damage.

An insulating shim may be used between the skin 2 and spar 5, as shown at 16 in FIG. 1, to further improve the safe dissipation of the lightning current via the bevelled parts of the bolts 1 and nuts. A PRC layer may be provided between the shim 16 and the skin 2.

The nut and bolt may be coated with a soft metal coating to improve the electrical contact between the nut and bolt head and the surface of the carbon fibre composite.

Figure 3:
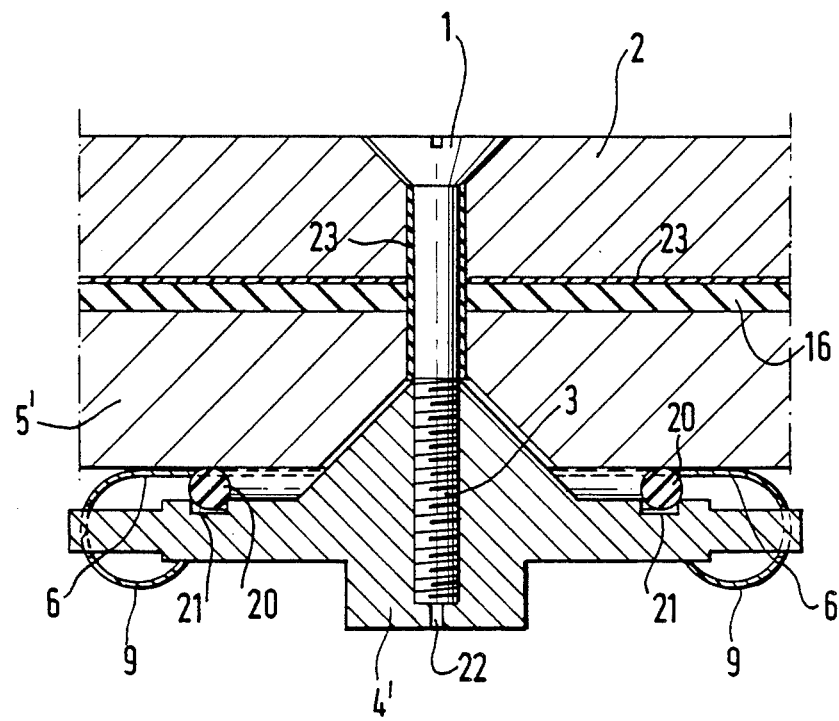
FIG. 3 is a section view of an alternative form of fastener having particular application to the construction of aircraft fuel tanks of composite material.

FIG. 3 shows an alternative form of fastener for use in the construction of composite material fuel tanks for aircraft, where there is a serious risk of an explosion in the event that lightning strikes the fastener unless careful anti-lightning strike measures are taken. Like elements in FIGS. 1 and 3 have been given corresponding reference numerals. The fuel tank fastener has to have three main characteristics vis (a) it must, of course, securely fasten the substructure (fuel tank wall 5') to the skin 2, (b) it must prevent fuel from leaking out of the fastener bore, and (c) it must dissipate lightning strikes efficiently and without sparking. The first of these characteristics is met by the general bolt, captive cage and caged nut arrangement of FIG. 3. The anti-lightning characteristic is achieved in essentially the same manner as with the fastener of FIG. 1 ie, by providing bevelled surfaces on both bolt head 1 and nut 4' which make intimate, electrically conductive non-sparking contact with the wing skin 2 and fuel tank walls 5'.

Figure 2:
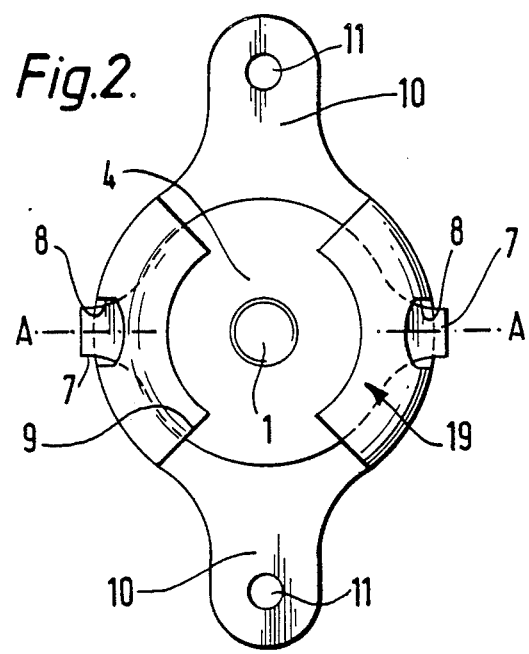
FIG. 2 is a plan view of a base plate/cage arrangement for use in conjunction with the fastener of FIG. 1 and shown sectioned along the line A—A therein.

For fuel leak prevention the fastener of FIG. 3 has a blind nut 4' initially loosely and non-rotationally held within cage 6 which is in turn secured to the fuel tank wall 5' in the manner described with reference to FIG. 2. The blind nut 4' has a small gas release hole 22 bored centrally and axially in its blind end. The circumferential flange 19 has a circumferentially extending recess 21 in the surface which is to engage the fuel tank wall 5'. The recess 21 carries a stiff rubber ring seal 20.

When the aircraft is constructed, liquid shim 16 is applied to the surface of the sub-structure 5' with a cling film protective upper layer. The skin 2 is then applied and fastener bores are drilled through skin and substructure. The shim 2 is then removed; the skin does not adhere to the liquid skin because of the cling film which is then removed. Nuts 4' are then secured to the fuel tank under walls by means of their cages 6. Sealant 23 is then applied to the liquid skin upper surface and the skin 2 is reapplied. The bolts 1, which may be dipped in sealant, are then tightened into the nuts 4'. Any gas that would have been trapped between the bolt end and the blind nut by the tightening process escapes via the gas release hole 22. The action of tightening cleans out any sealant trapped between the bevelled walls of the bolt head 1 and nut 4', but sealant 23 remains between the bolt shank and the surrounding skin 2 and fuel tank wall 5'. Hence electrically the fastener is identical to the fastener of FIG. 1 and has the same anti-lightning strike characteristics.

Not only does the ring seal 20 prevent fuel from escaping from the fastener bores but it also acts to stop any hot particle penetration of the fuel during a lightning strike, eg, hot material ejected from the interface between nut 4' and the CFC wall 5'.

The use of a blind nut 4' also acts to constrain any hot material ejected from the nut/thread interface during a lightning strike.

I claim:

1. A fastener for joining a first structure made of composite material to a second structure made of composite material comprising:
    a bolt bevelled at one end so it can be countersunk into the surface of said first structure and having a threaded portion at the other end,
    a captive nut which is capable of co-operating with the threaded portion of the bolt and which is bevelled so it can be countersunk into the surface of said second structure,
    insulating material on the bolt between the bevel and threaded portion, and
    a cage adapted to be secured to said second structure for holding the nut loosely captive so as to permit limited movement thereof and for facilitating fastening of the nut to the bolt by initially limiting rotation of the nut and permitting sufficient movement so that the nut may be engaged with the bolt even when the nut and bolt are initially slightly off axis, whereby in use the bolt may be tightened into the captive nut so as to draw the beveled surfaces of nut and bolt into intimate contact with said first and second surfaces providing thereby a good electrically conductive path between the fastener and said first and second surfaces.

2. A fastener according to claim 1 in which said nut and or said bolt are coated with a soft electrically conductive material so that in use electrical contact between the fastener and the composite material is enhanced.

3. A fastener according to claims 1 in which the bevel of the bolt head and nut defines a surface which is substantially conical or at least frusto-conical.

4. A fastener as claimed in claim 1 and wherein said nut has an annular flange and the cage comprises a washer-like component having an internal bore of diameter smaller than the diameter of said flange and having crimpable portions which in use may be bent over the annular flange of said nut when located in the internal bore of the cage and crimped thereto to retain said nut captively within the cage.

5. A fastener as claimed in claim 4 and wherein said flange has one or more lugs and said crimpable portions have a corresponding number of apertures so that said lugs may be located within said apertures prior to crimping and so that after crimping said nut is substantially prevented from rotation within said cage.

6. A fastener as claimed in claim 1 and wherein the cage has lugs with rivet or pin locations by which said cage may be secured by rivet or pins to said second surface.

* * * * *